Oct. 1, 1963    S. P. KINNEY ETAL    3,105,672
BUTTERFLY VALVE WITH A RUBBER SEAT
Filed April 29, 1959    2 Sheets-Sheet 1
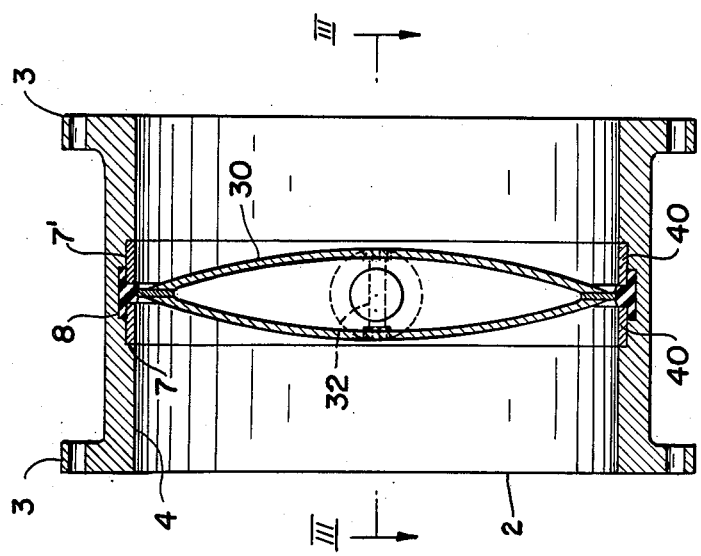
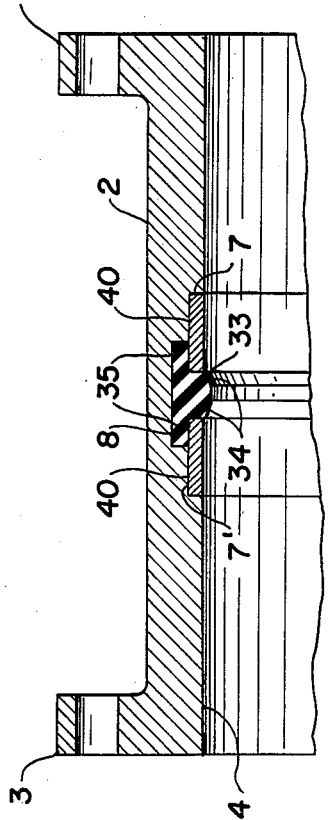
INVENTORS
Selwyne P. Kinney
BY Hugh B. Carr
Christy, Parmelee, Strickland
ATTORNEYS Oct. 1, 1963  S. P. KINNEY ETAL  3,105,672
BUTTERFLY VALVE WITH A RUBBER SEAT
Filed April 29, 1959  2 Sheets-Sheet 2
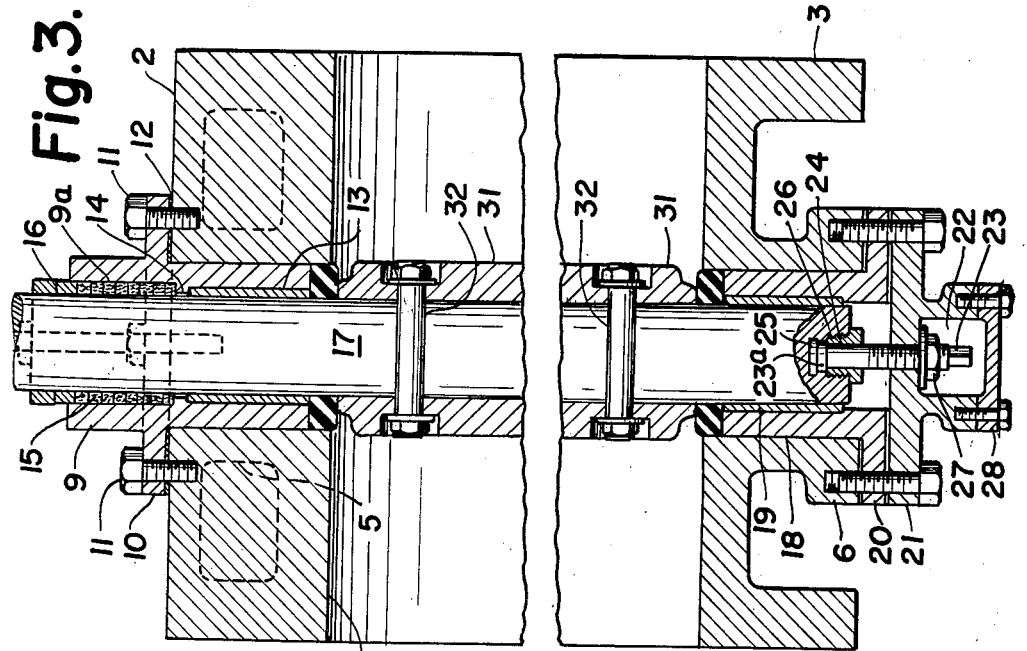
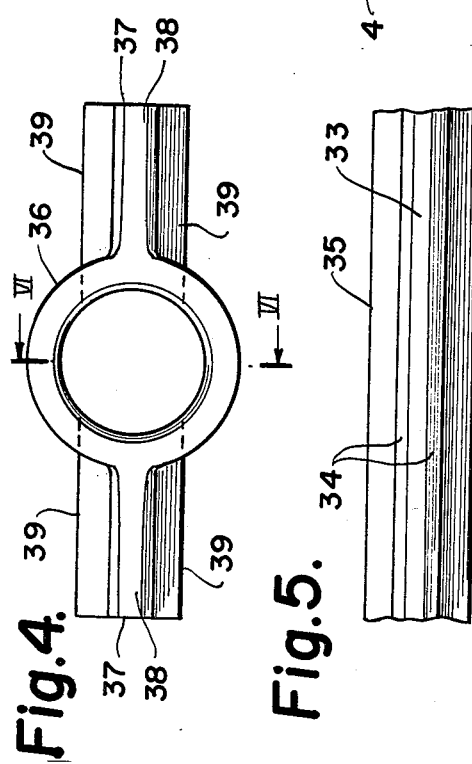
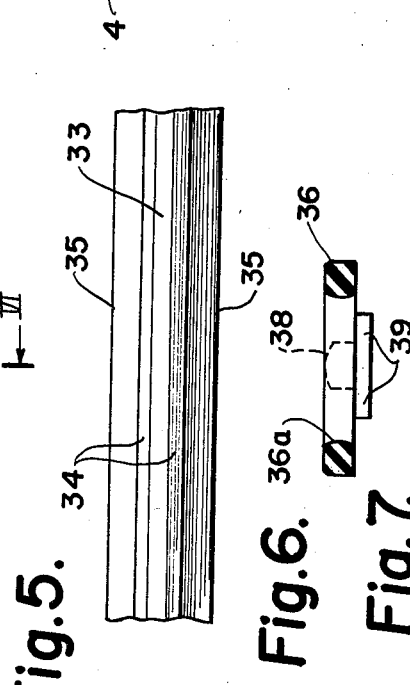
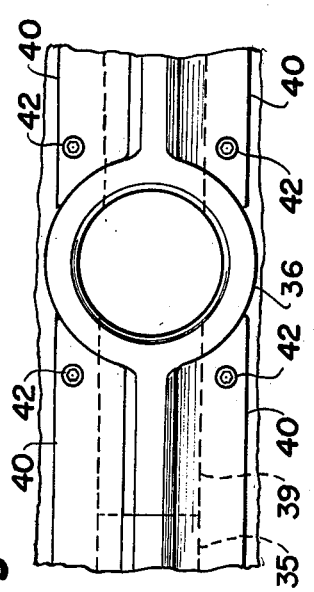
INVENTORS
Selwyne P. Kinney
Hugh B. Carr
BY
Christy, Parmelee Strickland
ATTORNEYS

United States Patent Office 3,105,672
Patented Oct. 1, 1963

3,105,672
BUTTERFLY VALVE WITH A RUBBER SEAT
Selwyne P. Kinney, Pittsburgh, and Hugh B. Carr, Carnegie, Pa., assignors to S. P. Kinney Engineers, Inc., Carnegie, Pa., a corporation of Pennsylvania
Filed Apr. 29, 1959, Ser. No. 809,790
1 Claim. (Cl. 251—306)

This invention relates to butterfly valves and is for a butterfly valve in which the valve gate seats in the closed position against a rubber seat in the valve body.

In a butterfly valve, the valve gate is carried on a rotatable shaft that passes diametrically across a circular passageway through the valve body. By rotation of the shaft the gate may be moved from a full open position where it is in the plane of the longitudinal axis of the passageway through an arc of 90° when the gate is then perpendicular to the axis of the passageway. In most cases, the periphery of the valve gate must be sealed against a seat to form a water or gas-tight closure. It has heretofore been proposed to have a rubber seating ring extending around the interior of the passageway in the plane of the valve gate when the gate is in the closed position against which the periphery of the gate will seat. Difficulty is encountered, however, in satisfactorily retaining the seat in the valve. One difficulty has been that the seating ring is molded to fit the recess in the valve body provided to accept it, and more particularly in holding the ring within the allowable dimensional tolerances. If the ring is too small, fluid under pressure will get under it and distort it. Attempts have been made to overcome this by embedding a wide flat steel band in the rubber, but this adds to the difficulty of inserting the seating ring in the valve body, while other factors, such as separation of the rubber from the steel, have resulted in an unduly high percentage of failure or leakage after short periods of use. Subsequently attempts were made by us to embed woven wire screen, such as "hardware screen" in the rubber, so that the band could be inserted more easily in the valve body, since the screen was more flexible than the steel band. Here again difficulty was encountered in preventing separation of the rubber from the screen. Also fluid under pressure would find its way under the rubber, or between the rubber and the screen. Moreover, difficulty was encountered in preventing leakage where the shaft joins the valve gate or disk at what might be termed the hub portions of the disk.

An object of the present invention is to provide a valve seating ring designed to overcome these difficulties.

A further object of our invention is to provide a seating ring in which the rubber is molded flat and the forming of the ring effected after the rubber is inserted in the valve body.

A further object of our invention is to provide an improved construction for holding the rubber in the valve body and preventing it from being dislodged or bulging, either by the action of fluid pressure, or by the pressure exerted against the rubber as the valve disk moves to closed position.

A still further object of our invention is to provide an improved arrangement for sealing the valve at and in the vicinity of the shaft or hub portion of the valve disk.

These and other objects and advantages are secured by our invention as will be understood by those skilled in the art from the following detailed description of our invention in conjunction with the accompanying drawings, in which:

FIG. 1 is a longitudinal section through a valve embodying our invention with the valve disk in the closed position;

FIG. 2 is a fragmentary view on a larger scale showing the same part of the seating ring with the valve disk out of contact therewith;

FIG. 3 is a horizontal longitudinal section in the plane of line III—III of FIG. 1;

FIG. 4 is a plan view of one of the seating ring sections at the place where the shaft passes therethrough;

FIG. 5 is a similar plan view of a fragment of the seating ring between the hub portions shown in FIG. 4;

FIG. 6 is a transverse section in the plane of line IV—IV of FIG. 4; and

FIG. 7 is a fragmentary view showing one of the hub and adjacent portions of the sealing ring in place in the valve body, but with the valve disk and operating shaft removed.

In the drawings, 2 designates a valve body having flanges 3 at its opposite ends by which it may be bolted to the flanges of the pipes that lead to and from the valve. It has a circular passageway 4 extending longitudinally from one end to the other. Intermediate its ends it is provided with integral bosses 5 and 6 which are diametrically opposed, and into which the ends of the valve shaft extend, as will be hereinafter more fully explained.

The interior of the valve body is provided with a wide channel 7 extending thereabout, the bottom of this channel having a deeper annular channel 8 cut therein, thereby providing a deep channel 8 centered in the plane of the diameter about which the bosses 5 and 6 are centered, and there is a wide longitudinal flat recessed area in the passageway at each side of the deep channel 8, these wide flat areas being designated 7'.

Set into the boss 5 is a sleeve 9 having a flange 10 thereabout intermediate its ends. The inner end of this sleeve has a close working fit in the boss 5, while the flange 10 is bolted into the end face of the boss by bolts 11. One or more thin gaskets 12 are interposed between the flange 10 and the face of the boss. The inner end of the sleeve carries a bearing insert sleeve 13. The sleeve 9 is made so that it may be used on different sizes of valves, and for smaller valve shafts, a bearing sleeve having a smaller internal diameter than the one shown may be substituted. There is an internal shoulder 14 inside the sleeve 9 at the outer end of the bearing 13, and outside of this the sleeve has a portion 9a in which packing material 15 is received. A gland 16 compresses this packing about the valve shaft, which is designated 17, and which extends through the bearing 13 and diametrically across the passageway 4 in the valve into the boss 6.

In the boss 6 there is inserted a sleeve 18 in which is a bearing sleeve 19. Sleeve 18, like sleeve 9, may be a standard piece for several valve sizes and with a smaller valve shaft, an appropriately smaller internal diameter bearing sleeve 19 is inserted in it. Sleeve 18 has a flange 20 bolted to the end of the boss 6. Also bolted to the end of the boss is a cover plate 21 having a central well 22 formed on its outer face. An adjusting screw 23 is threaded through the cover plate and enters a recess 24 in the end of the valve shaft 17, being in axial alinement with the shaft. This bolt has a flange 23a on its inner end that is confined between a bearing disk 25 in the recess and a thrust collar 26 around the inner end of the screw. The arrangement is such that by turning the screw one way or the other, the shaft may be adjusted endwise in its bearings, while the screw, being swiveled to the shaft in the manner described, does not rotate with the shaft. A jam nut 27 is provided on the outer end of the screw, and a second cover plate 28 may be provided over the end of the well 22, but this is generally used only when the valve is buried in the ground, or otherwise needs protection for the thrust adjusting screw.

The valve disk 30 is comprised of two oppositely dished circular plates with their concaved surfaces confronting and welded together at the periphery. They are provided at one diameter with portions 31 to accommodate the valve shaft, and are secured to the valve shaft for rotation therewith by bolts 32.

The rubber seating ring may now be described. Rubber is molded in straight strips, as shown in FIG. 5, in desired lengths, the strips being of generally T-shaped section, providing a main rib portion 33 with beveled surfaces 34 at the top of the rib. Laterally-projecting flanges 35 extend from each side of the base of the rib, to give it the T shape above referred to, but the stem of the T is much wider in section than the thickness of the flanges. The maximum width of the strip is such that it will fit snugly in the channel 8, and when such a strip is fitted into the channel, the top of the ridge with its beveled surfaces will protrude slightly into the passageway 4 through the valve, and the flanges at the base will be slightly above the flat areas 7 at each side of the channel 8.

The two sections, which we shall term the hub sections of the seating ring through which the shaft passes, are both alike. They have an annulus 36, both faces of which are flat, and which are of the same diameter as the sleeves 9 and 18. The hole through the center of the annulus has convex walls 36a (see FIG. 6). At diametrically opposite points the annulus has short extensions 37 projecting therefrom which are of the same section as the straight strips 33—35, having a main ridge portion 38 and side flanges 39 at the base of the ridge. The top of the ridge is substantially flush with one face of the annulus 36, while the base portion of the rib continues across the under face of the annulus, as indicated in FIGS. 4 and 6. In other words, the rib protrudes slightly beyond the plane of the inner face of the extension pieces 38—39. This is so that when the channel 8 is machined in the valve body, the cutting tool can cut to a uniform depth and the extensions 38—39 will be received in the deep channel 8 in the valve body exactly the same as the strips 33—35, while the inner face of the annulus will set into the openings in the valve body in which the sleeves 9 and 18 are received, and bear snugly against the inner end of one of these sleeves.

In the manufacture of the sealing ring, the hub sections are placed in the valve body after all machining operations are complete, and the extensions 38—39 are fitted into the channel 8. Then a length of straight strip 33 is fitted into the channel 8 and cut to the right length to fill the intervening portion of the channel 8 and bear against the ends of the extensions 38—39 around one side of the passageway through the valve, and a similar strip is fitted into the channel around the other side of the passageway. After the pieces have thus been exactly fitted into place, all abutting ends are vulcanized to integrate the four sections of the seating ring into a single annulus. We may perform all of the vulcanizing in situ using the valve body as part of the vulcanizing mold, or we may vulcanize some of the joints by removal of the sections from the body, but at least the final joint is vulcanized in situ in order that there can be no final shortening or lengthening, and the annulus will exactly fit and fill the channel 8.

The rubber which is used commonly has a canvas or duck backing, and this is retained on the outer face of the seating ring, but is not necessary. The thickness of the flanges 35 in a radial direction is such that the channel 8 is overfilled to a level slightly above the level of the surfaces 7' at each side of the channel 8. Metal retaining strips 40 are provided for holding the rubber in the channel. These strips, formed of stainless or corrosion-resistant steel or other metal are wide, transversely flat strips of a thickness equal to the depth of the channel 7 in the valve body, and are of heavy gauge or thickness so as to resist buckling in a transverse direction under the conditions of use. This will usually be somewhere around 3/8 to 1/2 of an inch. They are wide enough so that one edge bears against one side of channel 7 and the other edge bears against a side face of the ridge of the rubber seating ring, the strips thereby covering that flange at the base of the seating ring which is on that side of the ridge on which the metal strip is located. There are of course similar strips on each side of the seating ring. Each strip is of nearly semi-circular shape, and the end portions 41 of each strip are contoured to fit around a quadrant of a hub section annulus 36 of the seating ring, so that, as shown in FIG. 7, each annulus 36 is substantially confined by the end portions of four strips 40. The strips 40 are held in place by machine screws 42 at intervals around the valve, these screws passing through the strips 40 into the valve body, but they do not pass through any part of the rubber seating ring. However, the strips are heavy enough so that when the screws 42 are "pulled down" tight, the strips will press down on the faces of the rubber seating ring flanges 35 and crowd the rubber more tightly into the channel 8. The strips 40 will be substantially flush with the inner walls of the passageway, and only a portion of the ridge of the seating ring will protrude into the passageway. The ridge protrudes only far enough that when the valve disk moves to the closed position, its periphery will ride on the beveled surfaces 34 on the ridge and crowd the rubber ahead of it as it moves to the full closed position, with the displaced rubber springing up in back of the edge of the disk, so that with the valve closed the rubber is pressed in by the periphery of the valve disk and bulges out around the edge of the faces of the disk, making a tight seal. The rubber ridge itself is much wider (in the direction of the length of the passageway through the valve) than the contacting periphery of the valve disk. With the small projection which the rib has beyond the retaining strips 40 and the thick base for the annulus, the ridge cannot fold over under pressure, or by reason of the transverse thrust against it as the valve disk moves to the closed position. It is stiff enough that it will not fold, but resilient enough to yield to the pressure of the valve disk against it. The sides of the channel 8 and the holding strips 4 resist the thrust tending to move the rubber seating ring one way or the other as the valve is closed, or due to the flow of fluid through the valve. The width of the channel 8 in proportion to its depth is such that the seating ring confined by strips 40 cannot buckle or warp under such pressure. The overall width of the channel 8 is less than the diameter of the valve shaft 17, and its depth is such that the seating ring cannot buckle or warp under such pressure.

As above pointed out, the outer end faces of the hub portion annuli 36 project into the openings into which the sleeves 9 and 18 are fitted, and bear against the end faces of one or the other of these sleeves. By adjusting the thrust screw 23 to move the shaft one way or the other, and by increasing or decreasing the thickness of the gaskets 12 which position the sleeve 9 in its bore, pressure can be applied to keep the valve tight where the annuli 36 bear against the hub faces of the valve disk. Thus the adjustment of the shaft and the sleeve 9 are important in keeping the valve tight at these locations when the valve is closed.

Because of the seating ring being fitted exactly to the valve and vulcanized, at least in part in the valve body, and the tightness with which the ring is wedged and held in the channel with the rubber under pressure to tightly seal against the bottom and sides of the channel, there is no space into which fluid under pressure can work its way to distort the seating ring or push it up or out, and metal reinforcement of the ring is not necessary. Also, the seating ring is flexible radially, and after being fitted to the valve body, it can be removed and replaced with ease for any assembly operations that are required, and the retaining strips 40 are easily inserted and secured in place, whereas the spring hoops heretofore required were difficult to insert or remove.

The valve as herein described uses less rubber than valves of this type as heretofore constructed, and the rubber is used more effectively and without material restriction of the passageway through the valve. Not only does it provide a more effective seal when closed, but since all sizes of valves over a wide range use the same rubber molds, there is considerable economy, and also economy of space, resulting from the elimination of a large number of molds, and from the fact that the molds may be straight flat molds.

The improved construction herein described is not only cheaper and easier to construct, but provides a more durable seal and one more easily replaced, and eliminates any temporary expedients for retaining the rubber, such as the adhesives which have heretofore been commonly used. The valve herein disclosed is an improvement in the valve shown in the application of Selwyne P. Kinney, Serial No. 723,703, filed March 25, 1958, now Patent No. 3,042,362.

We claim:

A butterfly valve comprising a valve body having an axial passageway therethrough and having a transverse shaft mounted therein extending diametrically across the passageway, a valve disk on said shaft, bearings for the shaft in the valve body, the valve body having a wide internal channel formed therein about the passageway and centered in the plane of the axis of the shaft, the wide channel being formed with a central deeper channel, a rubber seating ring in the deeper channel having a wide base portion that fits said deeper channel and which has a central ridge that projects into the passageway through the body far enough to be engaged by the valve disk when the disk is turned to a position transverse to the passage, the seating ring having diametrically-opposed hub portions thereon through which the shaft passes, the channel and valve body being shaped to provide sockets to receive said hub portions, the body having openings therethrough centered in said sockets to receive sleeves through which the ends of the shaft pass substantially semi-circular strips in the wide channel bearing against the opposite sides of the ridge of the seating ring and over-hanging the base of the seating ring to retain it in place, the strips terminating against the opposed hub portions of the seating ring, and screws passing through said strips into the valve body and to the side of the seating ring for holding the seating ring in place, and sleeves fitted in the openings bearing against the hub portions said bearings for the shaft being fitted in said sleeves the diameter of the said openings being of a greater length than the width of the wide channel.

References Cited in the file of this patent

UNITED STATES PATENTS

| | | |
|---|---|---|
| 1,977,351 | Phillips | Oct. 16, 1934 |
| 1,990,309 | Phillips | Feb. 5, 1935 |
| 2,053,668 | Kinzie | Sept. 8, 1936 |
| 2,153,414 | Dodge | Apr. 4, 1939 |
| 2,566,025 | Hauser | Aug. 28, 1951 |
| 2,847,181 | Muller | Aug. 12, 1958 |
| 2,912,218 | Stillwagon | Nov. 10, 1959 |
| 2,923,524 | Fawkes | Feb. 2, 1960 |
| 2,936,153 | Gaffin | May 10, 1960 |
| 2,991,043 | Saar | July 3, 1961 |
| 3,006,598 | Carr | Oct. 31, 1961 |

FOREIGN PATENTS

| | | |
|---|---|---|
| 245,650 | Great Britain | of 1926 |
| 670,327 | Germany | of 1939 |
| 994,490 | France | of 1951 |
| 1,130,544 | France | of 1957 |